United States Patent
Krutskevych et al.

(10) Patent No.: US 12,246,204 B2
(45) Date of Patent: *Mar. 11, 2025

(54) SPRINKLER AND SPRINKLER SYSTEM INCLUDING SAME

(71) Applicant: Marioff Corporation Oy, Vantaa (FI)

(72) Inventors: Nazar Krutskevych, Pomorske (PL); Wojciech Zimny, Gdansk (PL)

(73) Assignee: MARIOFF CORPORATION OY, Vantaa (FI)

( * ) Notice: Subject to any disclaimer, the term of this patent is extended or adjusted under 35 U.S.C. 154(b) by 937 days.

This patent is subject to a terminal disclaimer.

(21) Appl. No.: 17/058,790

(22) PCT Filed: Jul. 1, 2019

(86) PCT No.: PCT/US2019/040057
§ 371 (c)(1),
(2) Date: Nov. 25, 2020

(87) PCT Pub. No.: WO2020/018261
PCT Pub. Date: Jan. 23, 2020

(65) Prior Publication Data
US 2021/0197003 A1    Jul. 1, 2021

(30) Foreign Application Priority Data

Jul. 16, 2018  (EP) ..................... 18183762

(51) Int. Cl.
*A62C 37/14*    (2006.01)
*A62C 37/50*    (2006.01)
*G06K 19/07*    (2006.01)

(52) U.S. Cl.
CPC .............. *A62C 37/14* (2013.01); *A62C 37/50* (2013.01); *G06K 19/0723* (2013.01)

(58) Field of Classification Search
CPC ..... A62C 37/14; A62C 37/50; G06K 19/0723
See application file for complete search history.

(56) References Cited

U.S. PATENT DOCUMENTS 6,081,196 A    6/2000 Young
6,195,002 B1   2/2001 Evans, Jr. et al.
(Continued)

FOREIGN PATENT DOCUMENTS

AU        604161 B2    12/1990
AU     2010356228 A1    9/2012
(Continued)

OTHER PUBLICATIONS

Chinese Office Action for Application No. 201980042753.X; Issued Jan. 19, 2022; 6 Pages.
(Continued)

*Primary Examiner* — Steven M Cernoch
(74) *Attorney, Agent, or Firm* — CANTOR COLBURN LLP

(57) ABSTRACT

A sprinkler includes a sprinkler body having a fluid inlet; a seal configured to prevent fluid flow through the sprinkler body when the seal is in a first position; a bulb configured to retain the seal in the first position, the bulb configured to break at a temperature and allow the seal to move to a second position allowing fluid flow through the sprinkler body; and an identification device located within the bulb.

15 Claims, 4 Drawing Sheets

(56) References Cited

U.S. PATENT DOCUMENTS

| | | | |
|---|---|---|---|
| 6,357,531 | B1 | 3/2002 | Asselin |
| 7,023,341 | B2 | 4/2006 | Stilp |
| 7,081,815 | B2 | 7/2006 | Runyon et al. |
| 7,143,834 | B2 | 12/2006 | Dolan |
| 7,313,973 | B2 | 1/2008 | Shachar et al. |
| 7,436,294 | B2 | 10/2008 | Saga et al. |
| 7,450,020 | B2 | 11/2008 | Mcsheffrey et al. |
| 7,633,393 | B2 | 12/2009 | Bonne |
| 7,710,256 | B2 | 5/2010 | Tawil |
| 7,836,966 | B2 | 11/2010 | Mchugh et al. |
| 8,002,046 | B2 | 8/2011 | Neeb et al. |
| 8,193,935 | B2 | 6/2012 | Gates |
| 8,228,190 | B2 | 7/2012 | Smaidris et al. |
| 8,272,281 | B2 | 9/2012 | Mccarty |
| 8,668,023 | B2 | 3/2014 | Wilkins et al. |
| 8,797,141 | B2 | 8/2014 | Best et al. |
| 9,153,107 | B2 | 10/2015 | Austin |
| 9,155,928 | B2 | 10/2015 | Vilas Blanco et al. |
| 9,403,046 | B2 | 8/2016 | Schmitt et al. |
| 9,552,718 | B2 | 1/2017 | Fadell et al. |
| 9,552,720 | B2 | 1/2017 | Moffa |
| 9,606,013 | B2 | 3/2017 | Mcsheffrey, Jr. et al. |
| 9,672,712 | B1 | 6/2017 | Akers |
| 9,700,746 | B2 | 7/2017 | Bodemann |
| 9,805,588 | B2 | 10/2017 | Gritzo et al. |
| 9,978,256 | B1 | 5/2018 | Norton et al. |
| 9,993,675 | B2 | 6/2018 | Groen et al. |
| 10,092,785 | B2 | 10/2018 | Schmitt et al. |
| 11,364,400 | B2 * | 6/2022 | Krutskevych .......... A62C 37/11 |
| 2004/0194976 | A1 | 10/2004 | Kretzschmar |
| 2007/0075411 | A1 | 4/2007 | Tanigawa et al. |
| 2007/0240886 | A1 * | 10/2007 | Kil .......... A62C 37/50 169/39 |
| 2007/0241891 | A1 | 10/2007 | Bonne |
| 2015/0339568 | A1 | 11/2015 | Nekoogar et al. |
| 2016/0354626 | A1 | 12/2016 | Mcnamara et al. |
| 2017/0100617 | A1 | 4/2017 | Kochelek et al. |
| 2017/0209726 | A1 | 7/2017 | Hu et al. |
| 2018/0200552 | A1 | 7/2018 | Wertsberger |
| 2018/0286218 | A1 | 10/2018 | Kitterman et al. |
| 2018/0361183 | A1 | 12/2018 | Tanklevski et al. |
| 2019/0247689 | A1 * | 8/2019 | Trivelpiece .......... F16K 37/005 |
| 2020/0276464 | A1 | 9/2020 | Krutskevych |

FOREIGN PATENT DOCUMENTS

| | | |
|---|---|---|
| AU | 2015343181 B2 | 6/2017 |
| CA | 2911790 A1 | 5/2016 |
| CN | 1049994 C | 3/2000 |
| CN | 201489564 U | 5/2010 |
| CN | 202078685 U | 12/2011 |
| CN | 101898018 B | 6/2014 |
| CN | 105148441 A | 12/2015 |
| CN | 205391507 U | 7/2016 |
| CN | 206214621 U | 6/2017 |
| EP | 1119837 A1 | 8/2001 |
| EP | 1311323 B1 | 5/2008 |
| EP | 1845499 B1 | 2/2010 |
| EP | 2126434 B1 | 8/2011 |
| EP | 3040913 A1 | 7/2016 |
| EP | 3134187 A1 | 3/2017 |
| EP | 2856444 B1 | 8/2017 |
| EP | 3378539 A1 | 9/2018 |
| GB | 2521857 A | 7/2015 |
| IN | 201747000366 A | 5/2017 |
| JP | 2006015067 A | 1/2006 |
| JP | 2006115725 A | 5/2006 |
| JP | 05559199 B2 | 7/2014 |
| KR | 2009115096 A | 11/2009 |
| KR | 20160141475 A | 12/2016 |
| KR | 1702163 B1 | 2/2017 |
| WO | 0240101 A1 | 5/2002 |
| WO | 2005119585 A1 | 12/2005 |
| WO | 2013007902 A1 | 1/2013 |
| WO | 2015191619 A1 | 12/2015 |
| WO | 2016198622 A1 | 12/2016 |
| WO | 2017105289 A1 | 6/2017 |
| WO | 2017200390 A1 | 11/2017 |

OTHER PUBLICATIONS

Chinese Office Action for Application No. 201980042753.X; Issued Oct. 19, 2022; 10 Pages.

International Search Report for International Application No. PCT/US2019/040057, International Filing Date Jul. 1, 2019, Date of Mailing Oct. 15, 2019, 6 pages.

Written Opinion for International Application No. PCT/US2019/040057, International Filing Date Jul. 1, 2019, Date of Mailing Oct. 15, 2019, 8 pages.

European Patent Office, Extended European search report, Application No./Patent No. 19397506.7-1113, issued Aug. 22, 2019 (7 pp.) .

* cited by examiner

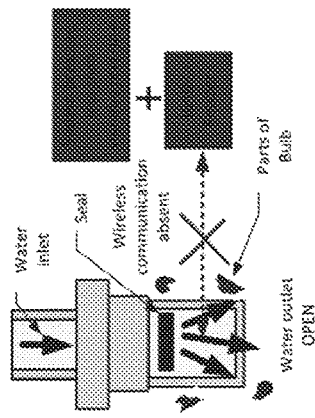
FIG. 5
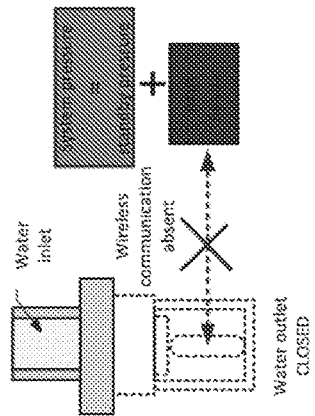
FIG. 4
FIG. 3

SPRINKLER AND SPRINKLER SYSTEM INCLUDING SAME

CROSS REFERENCE TO RELATED APPLICATIONS

This is a U.S. National Stage of Application No. PCT/US2019/040057, filed Jul. 1, 2019, which claims priority to European Application No. 18183762.6, filed Jul. 16, 2018, the disclosures of which are incorporated herein by reference in their entireties.

BACKGROUND

The embodiments disclosed herein relate generally to sprinkler systems, and more particularly, to a sprinkler having a bulb fitted with an identification device and a sprinkler system for use thereof.

Sprinkler systems typically include a plurality of sprinklers for emitting a fire suppression fluid in the event of a fire. Systems may track the location and/or status of each sprinkler using "smart" sprinklers fitted with wiring, sensors, processors, etc. Such sprinklers can be difficult to install on existing water distribution networks, since the electronics must be implemented inside the sprinkler body. Furthermore, such installations may require additional certification prior to operation.

BRIEF SUMMARY

According to an embodiment, a sprinkler includes a sprinkler body having a fluid inlet; a seal configured to prevent fluid flow through the sprinkler body when the seal is in a first position; a bulb configured to retain the seal in the first position, the bulb configured to break at a temperature and allow the seal to move to a second position allowing fluid flow through the sprinkler body; and an identification device located within the bulb.

In addition to one or more of the features described herein, or as an alternative, further embodiments may include wherein the identification device comprises an electronically readable device.

In addition to one or more of the features described herein, or as an alternative, further embodiments may include wherein the identification device comprises an RFID device.

In addition to one or more of the features described herein, or as an alternative, further embodiments may include wherein the identification device comprises a passive device.

In addition to one or more of the features described herein, or as an alternative, further embodiments may include wherein the identification device comprises a passive device.

According to another embodiment, a sprinkler system includes a fluid source; a pipe coupled to the fluid source; a sprinkler coupled to the pipe, the sprinkler including a bulb having an identification device located therein; a reader configured to read a sprinkler identification code from the identification device; and a controller configured to receive the sprinkler identification code from the reader.

In addition to one or more of the features described herein, or as an alternative, further embodiments may include a sensor configured to sense a fluid parameter of the sprinkler system.

In addition to one or more of the features described herein, or as an alternative, further embodiments may include wherein the controller is configured to perform an installation process comprising: receive a reader identification code from the reader; receive the sprinkler identification code from the reader; determine a location of the sprinkler in response to the reader identification code; compare the location of the sprinkler to a reference layout to confirm that the sprinkler is installed at a correct location.

In addition to one or more of the features described herein, or as an alternative, further embodiments may include wherein the installation process comprises: determining a sprinkler type from the sprinkler identification code; comparing the sprinkler type to the reference layout to confirm that the sprinkler type is correct.

In addition to one or more of the features described herein, or as an alternative, further embodiments may include wherein the controller is configured to perform a monitoring process comprising: obtaining the fluid parameter from the sensor; determining a state of the sprinkler in response to the fluid parameter and the presence or absence of the sprinkler identification code.

In addition to one or more of the features described herein, or as an alternative, further embodiments may include wherein when the fluid parameter indicates that sprinkler system is not active and the sprinkler identification code is present, the controller is configured to indicate a normal state.

In addition to one or more of the features described herein, or as an alternative, further embodiments may include wherein when the fluid parameter indicates that sprinkler system is not active and the sprinkler identification code is not present, the controller is configured to indicate a defect state.

In addition to one or more of the features described herein, or as an alternative, further embodiments may include wherein when the fluid parameter indicates that sprinkler system is active, the controller is configured to determine the location of the sprinkler for which the sprinkler identification code is not present.

According to another embodiment, a sprinkler system component includes a seal configured to prevent fluid flow through the component when the seal is in a first position; a bulb configured to retain the seal in the first position, the bulb configured to break at a temperature and allow the seal to move to a second position allowing fluid flow through the component; and an identification device located within the bulb.

According to another embodiment, a thermally responsive frangible bulb includes a container having a liquid therein; an identification element embedded in the container.

Technical effects of embodiments of the present disclosure include a sprinkler having a bulb fitted with an identification device that allows for identifying sprinkler location and identifying sprinkler status.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIGS. 3-5 depict sprinkler states in example embodiments; and

DETAILED DESCRIPTION

Figure 1:
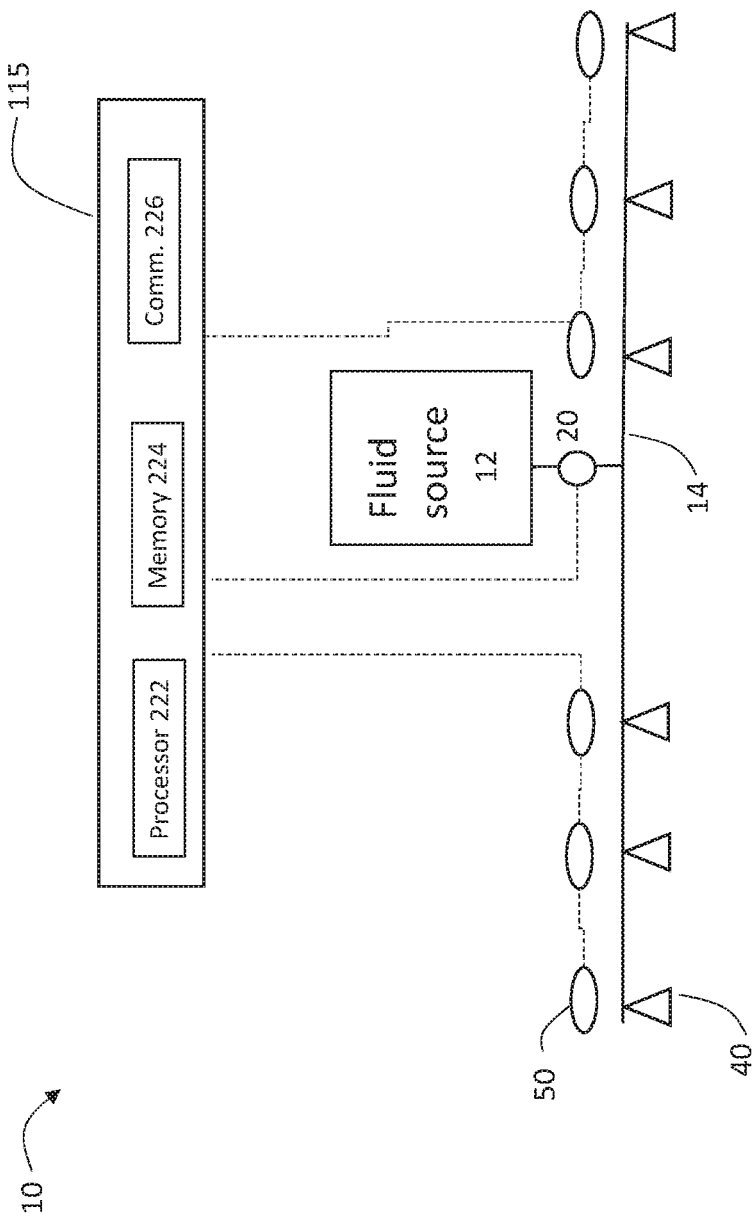
FIG. 1 depicts a sprinkler system in an example embodiment.

FIG. 1 depicts a sprinkler system 10 in an example embodiment. The sprinkler system 10 includes a fluid source 12 connected to one or more sprinklers 40 via one or more pipes 14. The fluid source 12 may be water and may be under pressure to direct the fluid to the sprinklers 40. In other embodiments, a pump may be used to direct fluid to the sprinklers 40. The sprinkler system 10 may be a "wet pipe" type system, in which fluid is present in pipes 14. Upon breakage of a bulb at a sprinkler 40, a seal is opened and fluid is emitted at the sprinkler 40.

A controller 115 communicates with elements of the sprinkler system 10 as described herein. The controller 115 may include a processor 222, a memory 224, and communication module 222. The processor 222 can be any type or combination of computer processors, such as a microprocessor, microcontroller, digital signal processor, application specific integrated circuit, programmable logic device, and/or field programmable gate array. The memory 224 is an example of a non-transitory computer readable storage medium tangibly embodied in the controller 115 including executable instructions stored therein, for instance, as firmware. The communication module 226 may implement one or more communication protocols to communicate with other system elements. The communication module 226 may communicate over a wireless network, such as 802.11x (WiFi), short-range radio (Bluetooth), or any other known type of wireless communication. The communication module 226 may communicate over wired networks such as LAN, WAN, Internet, etc.

One or more readers 50 obtain an identifier from each sprinkler 40. The readers 50 may be RFID readers that read a unique, sprinkler identification code from an identification device at each sprinkler 40. In one embodiment, a single reader 50 is associated with each sprinkler 40 in a one-to-one fashion. The readers 50 may communicate with one or more sprinklers 40 using wireless protocols (NFC, radio waves, etc.). The readers 50 communicate with controller 115 over a wireless and/or wired network. The readers 50 may also form a mesh network, where data is transferred from one reader 50 to the next, eventually leading to the controller 115. Each reader 50 is programmed with a unique, reader identification code that identifies each reader 50 to the controller 115.

The sprinkler system 10 includes one or more sensors 20. Sensor 20 detects one or more fluid parameters, such as fluid pressure in pipes 14 or fluid flow in pipes 14. Sensor(s) 20 may be located at the outlet of the fluid source 12 or along various locations along pipes 14. The fluid parameter is used by the controller 115 to determine the status of the sprinkler system 10 (e.g., has a sprinkler 40 been activated). Sensor 20 communicates with controller 115 over a wireless and/or wired network. Controller 115 uses the fluid parameter from sensor 20 and the presence or absence of sprinkler identification codes to determine the state of each sprinkler 40.

Figure 2:
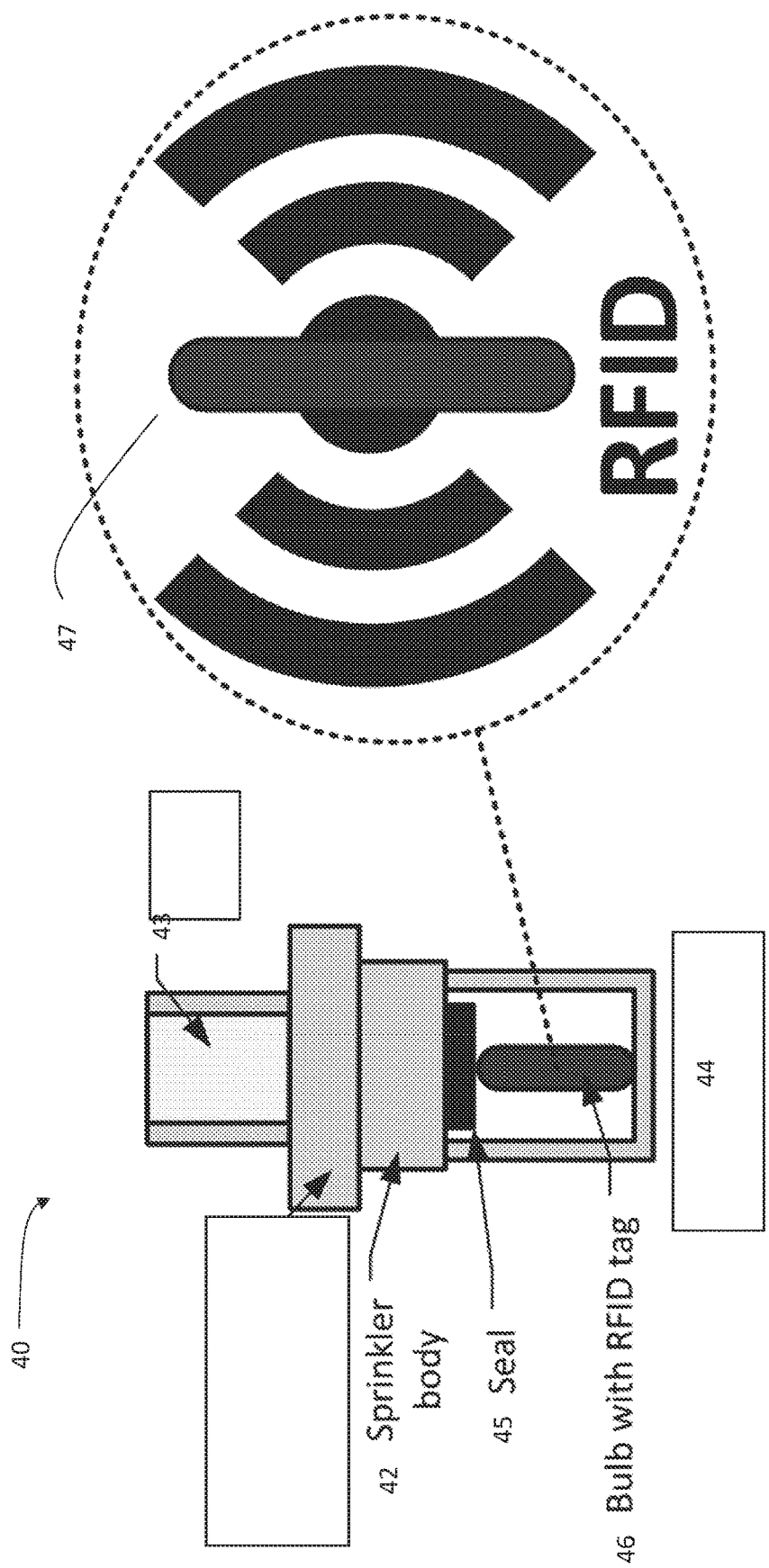
FIG. 2 depicts a sprinkler in an example embodiment.

FIG. 2 depicts a sprinkler 40 in an example embodiment. The sprinkler 40 includes a sprinkler body 42 having a fluid inlet 43 and fluid outlet 44. The fluid inlet 43 is in fluid communication with pipe 14. Between the fluid inlet 43 and the fluid outlet 44 is a seal 45. A bulb 46 maintains the seal in a first position (i.e., closed) preventing fluid from exiting the fluid outlet 44. The bulb 46 may be a thermally responsive, frangible bulb having a liquid within a container (e.g., quartzoid bulb). When the bulb 46 breaks due to temperature, the seal 45 moves to a second position allowing fluid to flow through the sprinkler 40.

The bulb 46 includes an identification device 47, which is illustrated as an RFID element. The identification device 47 may be encoded with a unique, sprinkler identification code identifying the sprinkler 40. The sprinkler identification code may also identify the type of sprinkler (e.g., flow rate, model number, etc.). The identification device 47 may be a passive device, meaning that no power source is installed in the bulb 46. The reader 50 interrogates the identification device 47 to retrieve the sprinkler identification code. The location of each reader 50 is programmed into the controller 115 upon installation of the sprinkler system 10. When the controller 115 receives the reader identification code and the sprinkler identification code, the controller 115 can determine the location of each sprinkler 40 in the sprinkler system 10.

FIG. 3-5 depict sprinkler states in example embodiments. The controller 115 uses the fluid parameter from sensor 20 and the presence or absence of the sprinkler identification code to determine a state of each sprinkler 40. In FIG. 3, the fluid parameter (e.g., system pressure, fluid flow) indicates that the sprinkler system 10 has not been activated (e.g., no bulbs are broken). The controller 115 also detects that the sprinkler identification code is present. This indicates a normal state.

In FIG. 4, the fluid parameter (e.g., system pressure, fluid flow) indicates that the sprinkler system 10 has not been activated (e.g., no bulbs are broken). The controller 115 also detects that the sprinkler identification code is absent. This indicates that the sprinkler 40 may be defective (e.g., identification device 47 malfunction) or that the sprinkler 40 has not been installed. This indicates a defect state. In such a case, an alert may be generated to direct maintenance personnel to that particular location (derived from the reader 50 associated with that sprinkler 40) to confirm the sprinkler 40 is present and repair as needed.

In FIG. 5, the fluid parameter (e.g., system pressure, fluid flow) indicates that the sprinkler system 10 has been activated (e.g., at least one bulb is broken). The controller 115 also detects that the sprinkler identification code is absent. This indicates that the bulb 46 for this sprinkler has broken (e.g., fire at the sprinkler location). This indicates a release state. The controller 115 can then initiate an alarm and generate a message identifying the location where the sprinkler 40 has been activated. This message may be used by responders in addressing the fire.

Figure 6:
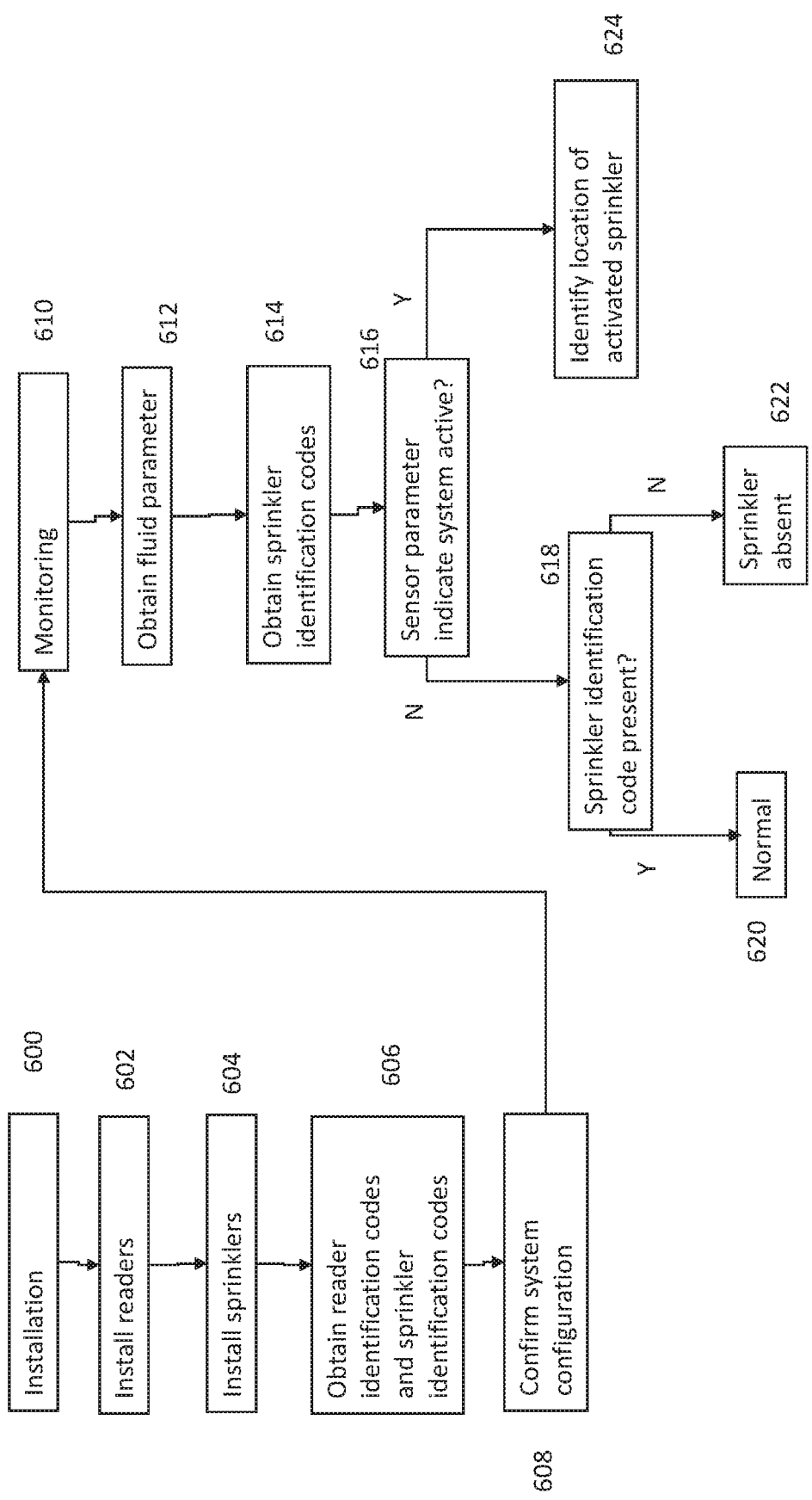
FIG. 6 depicts a control process in an example embodiment.

FIG. 6 depicts a control process in an example embodiment. The control process may include two phases, namely, installation and monitoring. The installation phase begins at 600. At 602, the readers 50 may be installed at expected sprinkler locations. The readers 50 may be installed based on a reference layout of the sprinkler system 10. The location of each reader 50 (e.g., floor, zone, room, etc.) and each reader identification code is stored in controller 115. In this way, the controller 115 knows the physical location of each reader 50.

At 604, the sprinklers 40 are installed. It is understood that step 604 may be performed before step 602. At 606, each reader 50 polls an associated sprinkler 40 and sends the reader identification code and the sprinkler identification code to the controller 115. This provides the controller 115 with a physical layout of all sprinklers 40. At 608, the controller 115 may then compare the sensed layout of the sprinklers 40 (including sprinkler types) to the reference layout to confirm that the correct sprinklers 40 are installed at the correct locations. If errors are detected, maintenance personnel can be directed to the location of each sprinkler 40 where an error is detected.

Once the sprinkler system configuration is confirmed at 608, the process may then enter the monitoring phase at 610. The monitoring phase 610 may be performed periodically (e.g., once per minute) so that the status of the sprinkler system 10 and sprinklers 40 is monitored in real-time.

The monitoring phase includes the controller 115 monitoring the fluid parameter from sensor 20 at 612. At 614, the controller obtains the sprinkler identification codes from the readers 50. At 616, the controller 115 determines whether the fluid parameter from sensor 20 indicates that the sprinkler system is active. As noted above, the fluid parameter, for example, fluid pressure or fluid flow, indicates whether the sprinkler system 10 has been activated (e.g., a bulb has broken).

At 616, if the sprinkler system has not been activated, flow proceeds to 618 where the controller 115 determines if all the sprinkler identification codes have been received. If all the sprinkler identification codes are present, then flow proceeds to 620 where the controller 115 determines that the sprinkler system 10 is in a normal state. The process may then proceed back to 610.

If all the sprinkler identification codes are not present at 618, then flow proceeds to 622 where the controller 115 determines that a sprinkler 40 (corresponding to the missing sprinkler identification code) has malfunctioned. For example, the identification device 47 in the bulb 46 may be damaged or the reader 50 may be malfunctioning. A maintenance message may be generated by the controller 115 including the location of the sprinkler 40 for which no sprinkler identification code is present. The process may then proceed back to 610.

If at 616, the controller 115 determines that the sprinkler system is active (e.g., a bulb has broken and fluid is flowing in pipe 14), flow proceeds to 624 where the controller 115 determines the location of the sprinkler(s) 40 for which no sprinkler identification code is present. The controller 115 can then initiate an alarm and generate a message identifying the location where the sprinkler 40 has been activated. This message may be used by responders in addressing the fire. The process may then proceed back to 610.

Embodiments described above refer to a bulb 46 within a sprinkler 40. The bulb 46 having the identification device 47 may be used with other components of sprinkler systems where a conventional bulb is installed. For example, a section valve of a dry-pipe system may utilize a bulb 46 having an identification device 47, as described herein. When the bulb breaks, a seal moves from a first position to a second position to allow fluid flow through the component. Thus, embodiments are not limited to sprinklers, but rather any component using a bulb to control fluid flow. Other embodiments may be directed to the bulb itself, in the form of a frangible bulb that comprises an embedded identification device (e.g., an RFID tag) and bulb liquid sealed inside container (e.g., a quartzoid bulb).

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A sprinkler comprising:
   a sprinkler body having a fluid inlet;
   a seal configured to prevent fluid flow through the sprinkler body when the seal is in a first position;
   a bulb configured to retain the seal in the first position, the bulb configured to break at a temperature and allow the seal to move to a second position allowing fluid flow through the sprinkler body; and
   an identification device located within the bulb, the identification device encoded with an identification code.

2. The sprinkler of claim 1, wherein the identification device comprises an electronically readable device.

3. The sprinkler of claim 1, wherein the identification device comprises an RFID device.

4. The sprinkler of claim 2, wherein the identification device comprises a passive device.

5. The sprinkler of claim 3, wherein the identification device comprises a passive device.

6. A sprinkler system comprising:
   a fluid source;
   a pipe coupled to the fluid source;
   a sprinkler coupled to the pipe, the sprinkler including a bulb having an identification device located therein, the identification device encoded with a sprinkler identification code identifying the sprinkler;
   a reader configured to read the sprinkler identification code from the identification device; and
   a controller configured to receive the sprinkler identification code from the reader.

7. The sprinkler system of claim 6, further comprising a sensor configured to sense a fluid parameter of the sprinkler system.

8. The sprinkler system of claim 7, wherein the controller is configured to perform an installation process comprising:
   receive a reader identification code from the reader;
   receive the sprinkler identification code from the reader;
   determine a location of the sprinkler in response to the reader identification code; and
   compare the location of the sprinkler to a reference layout to confirm that the sprinkler is installed at a correct location.

9. The sprinkler system of claim 8, wherein the installation process comprises:

determining a sprinkler type from the sprinkler identification code; and comparing the sprinkler type to the reference layout to confirm that the sprinkler type is correct.

10. The sprinkler system of claim 7, wherein the controller is configured to perform a monitoring process comprising:

obtaining the fluid parameter from the sensor; and determining a state of the sprinkler in response to the fluid parameter and the presence or absence of the sprinkler identification code.

11. The sprinkler system of claim 10, wherein when the fluid parameter indicates that the sprinkler system is not active and the sprinkler identification code is present, the controller is configured to indicate a normal state.

12. The sprinkler system of claim 10, wherein when the fluid parameter indicates that the sprinkler system is not active and the sprinkler identification code is not present, the controller is configured to indicate a defect state.

13. The sprinkler system of claim 10, wherein when the fluid parameter indicates that the sprinkler system is active, the controller is configured to determine the location of the sprinkler for which the sprinkler identification code is not present.

14. A sprinkler system component, the component comprising:

a seal configured to prevent fluid flow through the component when the seal is in a first position;

a bulb configured to retain the seal in the first position, the bulb configured to break at a temperature and allow the seal to move to a second position allowing fluid flow through the component; and an identification device located within the bulb, the identification device encoded with an identification code.

15. A thermally responsive frangible bulb comprising:

a container having a liquid therein;

an identification device embedded in the container, the identification device configured to be encoded with an identification code.

* * * * *